(12) United States Patent
Liang et al.

(10) Patent No.: US 10,007,736 B2
(45) Date of Patent: Jun. 26, 2018

(54) METHODS PERFORMED BY ELECTRONIC DEVICES THAT FACILITATE NAVIGATING A WEBPAGE

(75) Inventors: Li-Feng Liang, Buffalo Grove, IL (US); Kun Zhao, Beijing (CN)

(73) Assignee: Google Technology Holdings LLC, Mountain View, CA (US)

( * ) Notice: Subject to any disclaimer, the term of this patent is extended or adjusted under 35 U.S.C. 154(b) by 512 days.

(21) Appl. No.: 14/310,906

(22) PCT Filed: Dec. 1, 2011

(86) PCT No.: PCT/CN2011/083316
§ 371 (c)(1),
(2), (4) Date: Jun. 20, 2014

(87) PCT Pub. No.: WO2013/078665
PCT Pub. Date: Jun. 6, 2013

(65) Prior Publication Data
US 2014/0379688 A1    Dec. 25, 2014

(51) Int. Cl.
*G06F 17/30* (2006.01)
(52) U.S. Cl.
CPC .. *G06F 17/30876* (2013.01); *G06F 17/30864* (2013.01); *G06F 17/30905* (2013.01)
(58) Field of Classification Search
CPC ................................................ G06F 17/30867
See application file for complete search history.

(56) References Cited

U.S. PATENT DOCUMENTS

| 6,839,702 B1 | 1/2005 | Patel et al. |
| 2001/0034630 A1* | 10/2001 | Mayer ............ G06Q 10/063112 705/7.14 |

(Continued)

FOREIGN PATENT DOCUMENTS

| CN | 101042699 A | 9/2007 |
| CN | 101093545 A | 12/2007 |
| JP | 2008257666 A | 10/2008 |

OTHER PUBLICATIONS

Extended European Search Report for European Patent Application No. 11876599.9, dated May 12, 2015.

(Continued)

*Primary Examiner* — Kris E Mackes
(74) *Attorney, Agent, or Firm* — Troutman Sanders LLP; James E. Schutz; Christopher C. Close, Jr.

(57) ABSTRACT

A processor of an electronic device can implement methods that facilitate navigating a webpage. The methods may include: receiving (602) data for a target webpage and storing (604) the target webpage data to a processor readable storage medium of the electronic device and determining (606) whether the target webpage's uniform resource locator (URL) was selected from a search results page generated by a search engine executing a search string. If the target webpage's URL was selected from a search results page, performing (650) a particular action. The particular action can include steps of: searching (851) the stored target webpage data for one or more instances of one or more parts of the search string, prioritizing (852) the one or more instances, and resizing (858) one or more parts of the target webpage having the one or more instances with the highest priority.

9 Claims, 15 Drawing Sheets

(56) References Cited

U.S. PATENT DOCUMENTS

| | | | |
|---|---|---|---|
| 2005/0028108 A1* | 2/2005 | Baudisch | G06F 17/30696 715/801 |
| 2007/0100650 A1 | 5/2007 | Ramer et al. | |
| 2007/0299830 A1 | 12/2007 | Muenchhoff et al. | |
| 2008/0320389 A1 | 12/2008 | Tanaka et al. | |
| 2009/0006938 A1 | 1/2009 | Yoo et al. | |
| 2009/0171148 A1 | 7/2009 | Lu et al. | |

OTHER PUBLICATIONS

Shiobara, Dossy: "Client-side query term highlighting demo using jQuery", Dossy's Blog, Sep. 12, 2006 (Sep. 12, 2006), pp. 1-3,XP055187270,Retrieved from the Internet: URL:http:I/dossy.org/2006/09/clientside-query-term-highlighting-demousing-jquery/ retrieved on May 4, 2015 Last Accessed: Jun. 12, 1015.

Riggott, Matt et al: "Enhance Usability by Highlighting Search Terms", Alistapart, Issue 186, Aug. 10, 2004 (Aug. 10, 2004), pp. 1-5, XP55187223, Retrieved from the Internet: URL:http://alistapart.com/article/searchhighlight retrieved on May 4, 2015 Last Accessed: Jun. 12, 2015.

Patent Cooperation Treaty, "PCT International Search Report" for International Application No. PCT/CN2011/083316, Aug. 30, 2012, 9 pages.

Gitiles, "android / platform/frameworks/base / android-3.2.4_r1 / . / core / java / android / webkit / ZoomManager.java", Dec. 2, 2011, 20 pages.

\* cited by examiner

FIG. 2

METHODS PERFORMED BY ELECTRONIC DEVICES THAT FACILITATE NAVIGATING A WEBPAGE

FIELD OF THE INVENTION

The present invention relates to web browser improvements, specifically regarding improvements to navigating a webpage.

BACKGROUND

Electronic devices such as personal computers, smart phones, and tablets have become popular and ubiquitous. Manufacturers of such devices are adding more and more features to these devices, and they are often equipped with powerful processors, significant memory, and open operating systems, which allow many developers to add different applications. Popular applications provide functions such as calling, emailing, texting, image acquisition, image display, music and video playback, location determination (e.g., GPS), and internet browsing functions, among others. Further, such devices often include various user input and output components for instructing operation of the devices and for perceiving information from the devices, respectively. For example, many mobile devices are equipped not only with various buttons and/or keypads, but also with touch detecting surfaces (such as touch screens or touch pads) by which a user, simply by touching a particular area of the mobile device and/or by moving a finger along the surface of the mobile device, is able to communicate instructions to control the electronic device. Even more impressive, such touch detecting surfaces can output visual content with great detail and precision.

Often mobile electronic devices (such as smart phones) have limited display screen and user interface surface area due to the desire to keep the device portable. Generally with such devices, when browsing the Internet only a part of the content of a webpage can be viewed at one time. Further, navigation within the content of the webpage requires complex and at times cumbersome interactions with a touch screen of such devices. Additionally, with respect to electronic devices with larger displays, navigation through the content of a webpage can be difficult for users with visual and/or physical impairments or disabilities. Thus, it would be desirable to provide electronic devices, and methods performed by electronic devices, that address one or more of these (and possibly other) concerns.

BRIEF DESCRIPTION OF THE DRAWINGS

FIGS. 1-3 illustrate screenshots of an example search results page, an example target webpage, and an example resized portion of the example target webpage, in that order, with respect to one or more example methods described herein.

DETAILED DESCRIPTION

Disclosed herein are example methods performed by electronic devices (such as personal computers and mobile devices) that facilitate navigating a webpage. The methods in at least some embodiments take advantage of preexisting technologies such as wired and wireless communication technologies, search engines (including well known Internet search engines), web browser and operating system functions, and computer programs described herein. The combination of these technologies results in an electronic device capable of receiving webpage data from a web server and then in-turn determining whether the immediately preceding webpage was a search results page. The combination of the technologies facilitates searching the webpage data for instances of parts of a search string in the contents of the webpage, and then upon finding parts of the search string, resizing a portion of the webpage containing the parts before displaying the webpage.

In some of the embodiments, the technologies first facilitate an electronic device receiving target webpage data from a web server. Second, the technologies facilitate a controller (e.g., a processor) of the electronic device determining whether the immediately preceding webpage was a search results page. Third, if the controller determines that the immediately preceding webpage was a search results page, a webpage contents searching program searches the target webpage data for instances of parts of a search string (which was the search string that caused the search results of the search results page) in the contents of the target webpage. Fourth, upon finding parts of the search string in the target webpage data, the controller causes resizing and displaying of a portion of the target webpage containing the parts of the search string.

Figure 1:
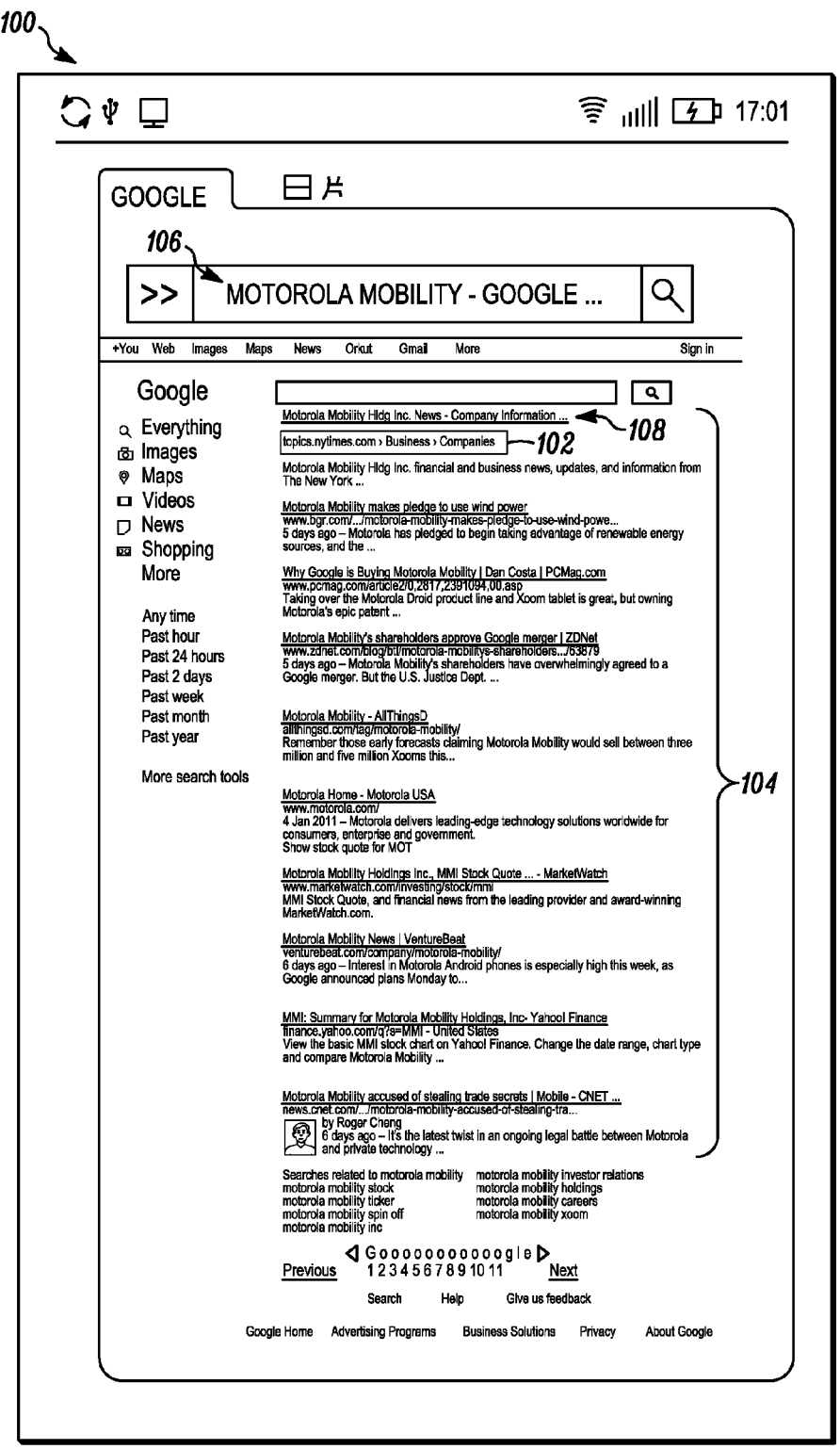
Figure 2:
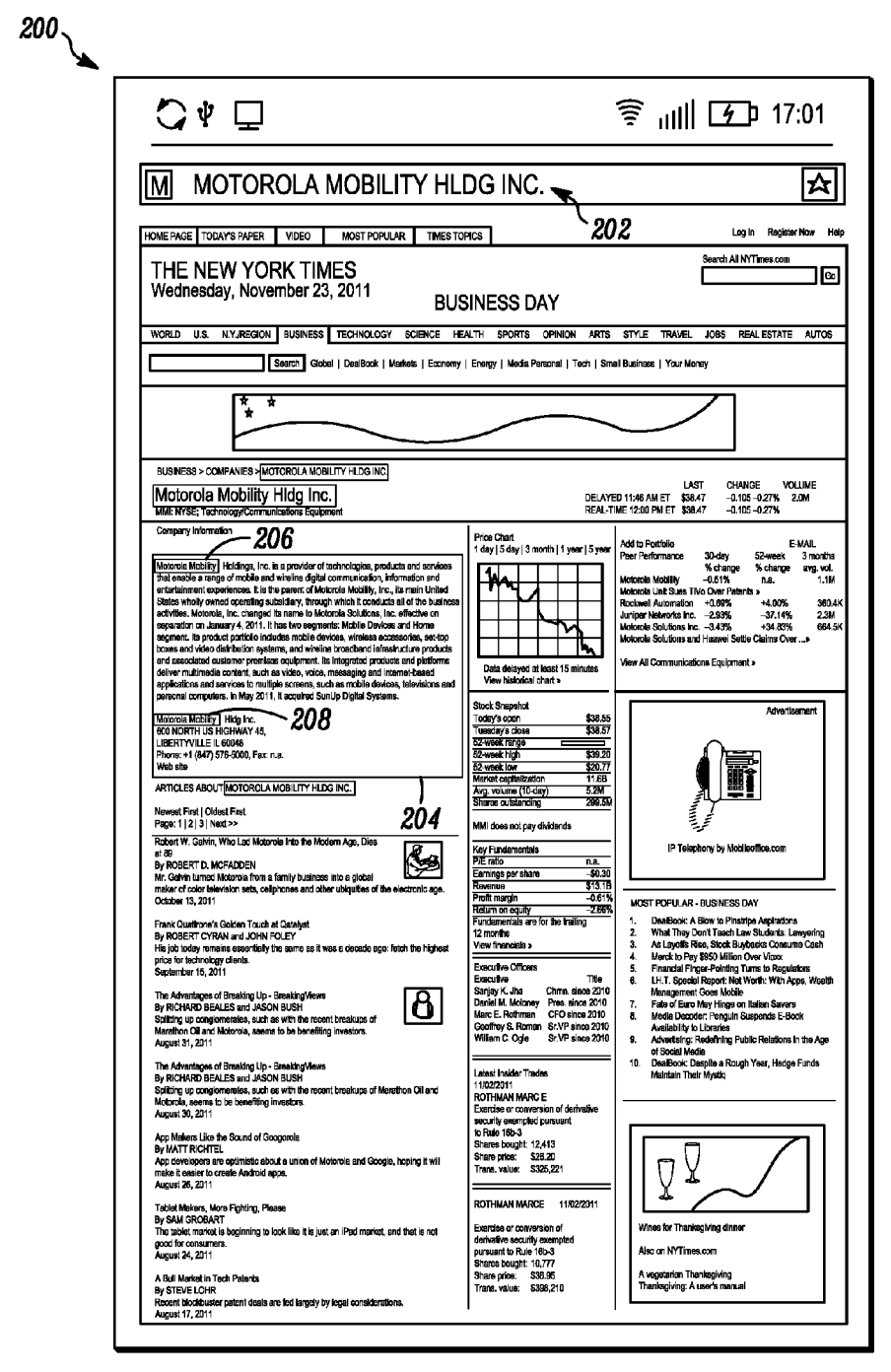
Figure 3:
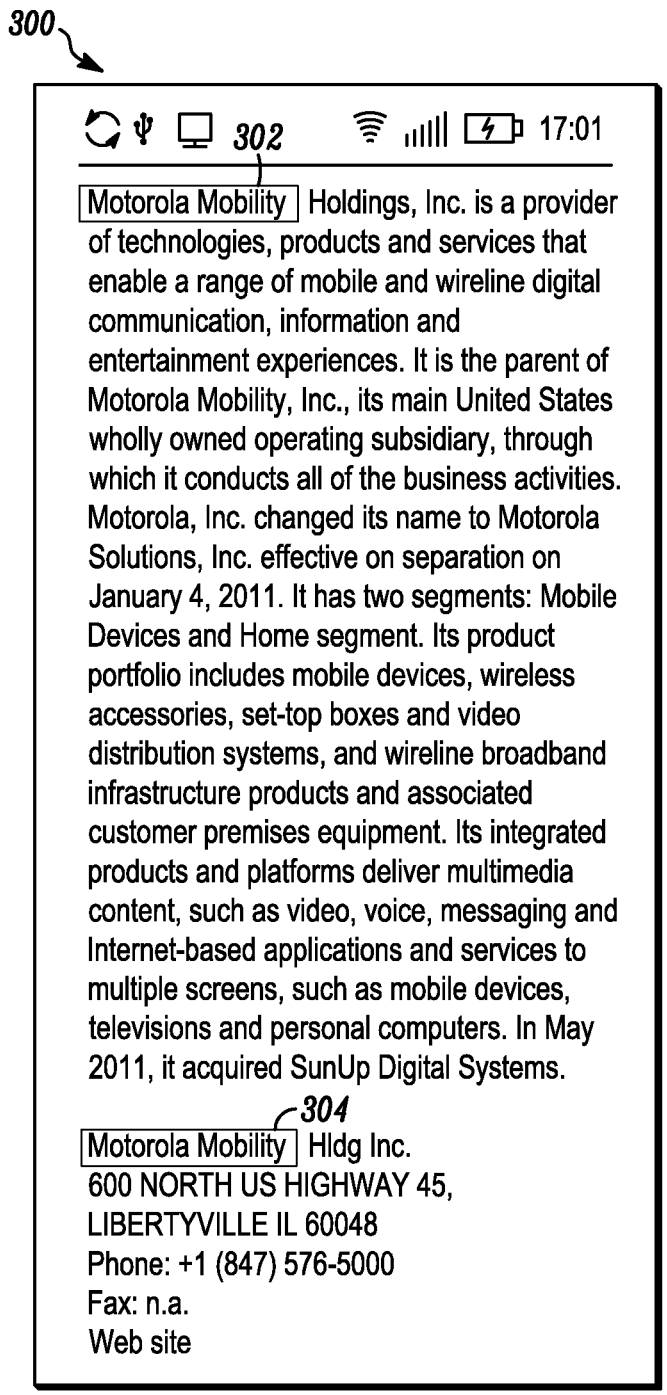

FIGS. 1-3 depict an example search results page 100, an example target webpage 200 that has a uniform resource locator (URL) 102 that locates the target webpage 200, and an example resized portion 300 of the target webpage 200, respectively (all of which are displayed by a web browser). The search results page 100 displays selectable (e.g., clickable) search results 104 of a search for content in the World Wide Web having text "Motorola Mobility," which is an example text string 106 (labeled as text string 202 in FIG. 2). As provided, a user can click on one of the results (e.g., a result 108) which causes the browser to display a resized portion 300 of the target webpage 200 rather than the target webpage 200 without resizing. As illustrated by FIG. 2, text of the target webpage 200 is difficult to read due to the size of the text. This issue is resolved in at least some of the embodiments by resizing a portion 204 of the webpage 200 containing instances of at least part of the text string 106 (labeled as instances 206 and 208, respectively, in FIG. 2), and resizing and rewrapping the text of that portion 204 as illustrated by FIG. 3. Where in FIG. 3 the instances 206 and 208 are represented by instances 302 and 304, respectively.

In some embodiments, prior to resizing the portion of the webpage containing the parts of the search string, the technologies can facilitate prioritizing instances of the parts of the search string, and then in-turn resize the portion of the webpage containing one or more of the instances with the highest priority. In some other embodiments, in addition to prioritizing the instances of the parts of the search string, parts of the webpage are ranked with respect to the prioritized instances, and then in-turn the technologies make possible resizing the part of the webpage having the highest rank. Additionally, in some embodiments, the controller facilitates the user to jump from one instance of the search term to another (initially within the same part of the webpage and later to other parts of the webpage in order of decreasing rank).

Figure 4:
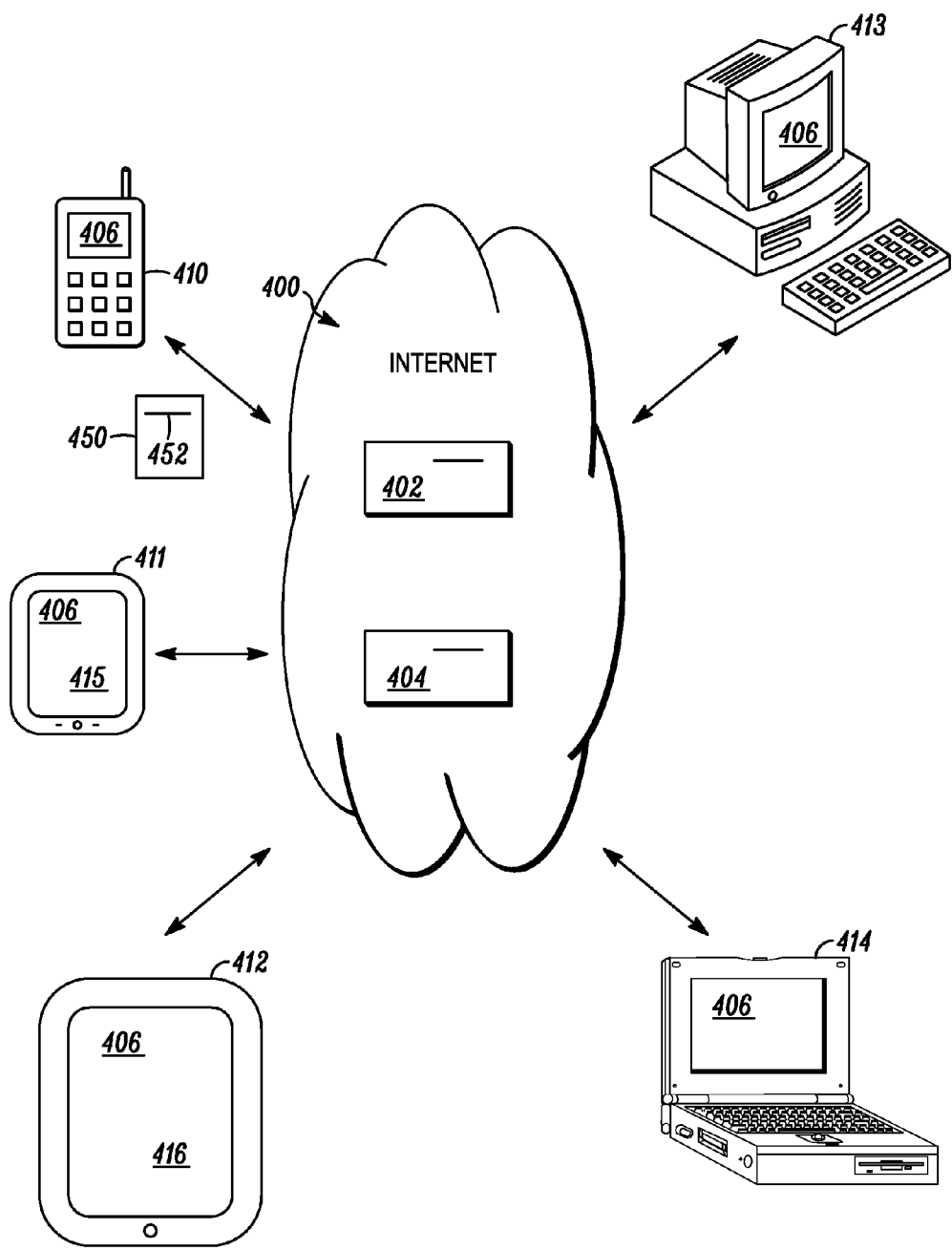
FIG. 4 illustrates an example network including one or more electronic devices, with respect to one or more example methods described herein.

FIG. 4 depicts multiple example electronic devices 410, 411, 412, 413, and 414 (410-414) of an example network that includes a mobile phone 410 or 411, a tablet computer 412, a desktop computer 413, and a laptop computer 414 (as more fully described with respect to FIG. 5) communicating with each other and server computers 402 and 404 through communication technologies such as the Internet 400. The electronic devices 410-414 can perform functions such as calling, emailing, texting, image acquisition, searching, and Internet browsing and searching, as well as alternate or other functions. In other embodiments, the electronic devices can include one or more of a variety of other devices such as a personal digital assistant, remote controller, and electronic book reader.

Also as shown, one or more of the electronic devices 410-414 can include a user-interface touch sensitive assembly, such as touch screens 415 and 416. Each of the touch screens 415 and 416 can include any of a variety of known touch detecting technologies such as a resistive technology, a capacitive technology, or an optical technology. Alternately, the touch sensitive assembly can include a touchpad (not overlapping the display screen), a joystick, a mouse, a keypad, a keyboard, or other types of graphical and tactile user interfaces. Additionally, the electronic devices 410-414 can include audio-based user inputs, such as a microphone. Such is especially useful for hands-free use or use by the visually impaired.

The electronic devices 410-414 may use a URL to request webpage data from server devices 402-404. The servers 402-404 may provide webpage data 450 and URLs 452 as requested by the electronic devices using any available wired or wireless communication medium. Frequently, a sequence of webpages are requested by a user, and the URLs for the sequence of webpages are stored in a browser history at the electronic device. As mentioned previously with respect to FIGS. 1-3, a search engine URL may initially be used to request a search engine webpage (not shown). After a user enters search terms into the search engine webpage, a second URL is used to return search results. (See FIG. 1.) A user may select one of the hyperlinks in a displayed search results webpage, which in turn uses a third URL to obtain webpage data for a subsequent webpage.

Figure 5:
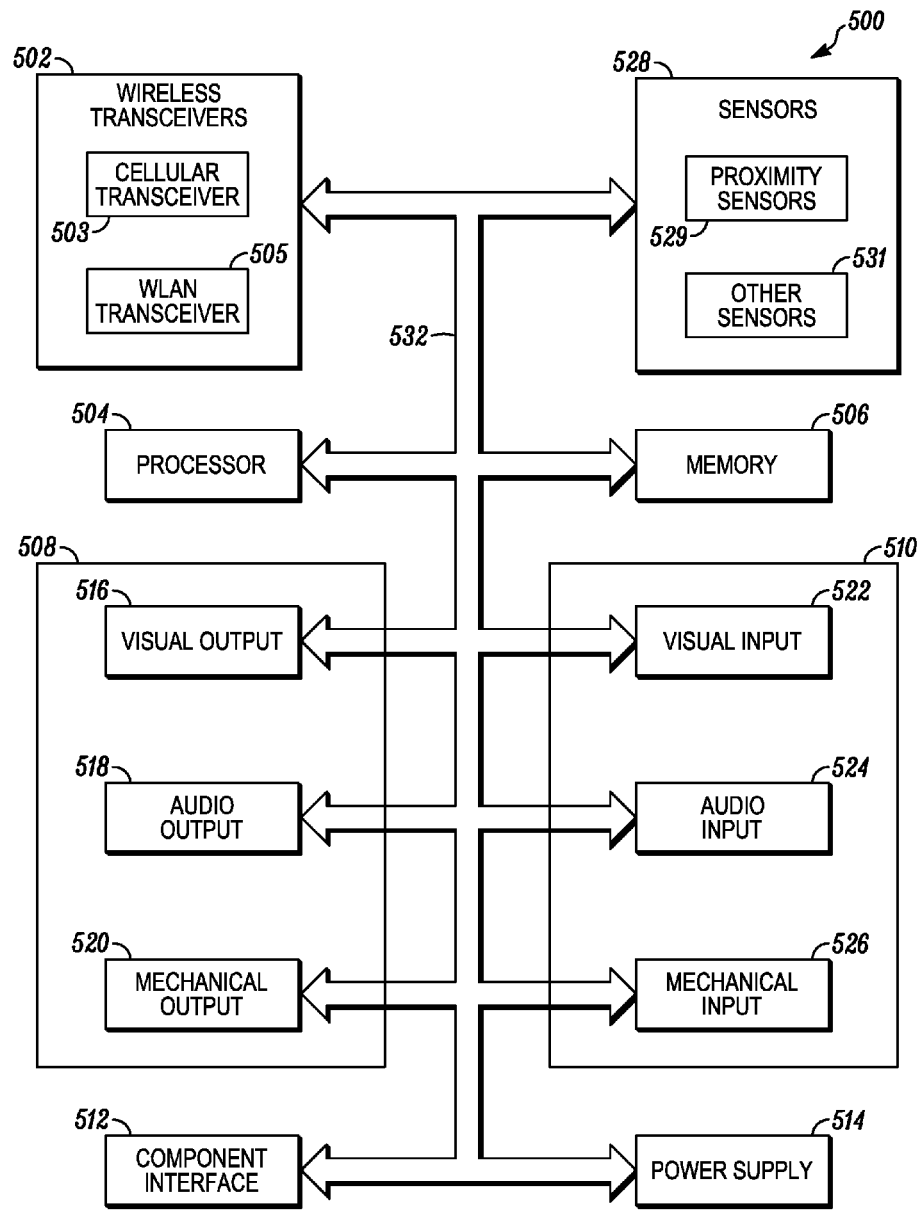
FIG. 5 is a block diagram of example components common to one or more of the electronic devices of FIG. 4.

Referring to FIG. 5, a block diagram 500 illustrates example internal components of the electronic devices of FIG. 4, including example internal components common to the mobile smart phones 410 and 411, the tablet computer 412, the desktop computer 413, and the laptop computer 414. Furthermore, one or more of the example internal components are also common to the server computers 402 and 404. These components can include wireless transceivers 502, a processor 504 (e.g., a microprocessor, microcomputer, application-specific integrated circuit, or the like), memory 506, one or more output components 508, one or more input components 510, and one or more sensors 528. The devices can also include a component interface 512 to provide a direct connection to auxiliary components or accessories for additional or enhanced functionality, and a power supply 514, such as a battery, for providing power to the other internal components. Additionally by way of one or more internal communication links 532, such as an internal bus, the links 532 can couple all the internal components to one another so that the components can communicate with one another.

The memory 506 (which in at least some embodiments, the processor 504 and the memory 506 are tightly coupled, such as being on the same silicon chip) can encompass one or more memory devices of any of a variety of forms (e.g., read-only memory, random access memory, static random access memory, dynamic random access memory, etc.), and can be used by the processor 504 to store and retrieve data. The data that is stored by the memory 506 can include operating systems, applications, and informational data. Each operating system includes executable code that controls basic functions of the electronic device, such as interaction among the various internal components, communication with external devices via the wireless transceivers 502 and/or the component interface 512, and storage and retrieval of applications and data to and from the memory 506. Each application includes executable code that utilizes an operating system to provide more specific functionality for the communication devices, such as file system service and handling of protected and unprotected data stored in the memory 506. Although many such programs govern standard or required functionality of the electronic devices 410-414, in many cases the programs include applications governing optional or specialized functionality, which can be provided in some cases by third party vendors unrelated to the mobile device manufacturer.

Finally, with respect to informational data, an operating system or programs for performing functions of the electronic devices 410-414 can reference and/or manipulate the non-executable code or information. Such informational data can include, for example, data that is preprogrammed upon the electronic devices 410-414 during manufacture, or any of a variety of types of information that is uploaded to, downloaded from, or otherwise accessed at servers or other devices with which the electronic devices 410-414 are in communication during their ongoing operation.

Furthermore, developers can program the electronic devices 410-414 such that the processor 504 and memory 506 of each device interact with the other components of the respective device to perform a variety of functions, including the methods described herein. Although not specifically shown in FIG. 5, the processor can include various modules for performing the methods described herein as well.

The wireless transceivers 502 can include both a cellular transceiver 503 and a wireless local area network (WLAN) transceiver 505. Each of the wireless transceivers 502 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

Example operation of the wireless transceivers 502 in conjunction with others of the internal components of the electronic devices 410-414 can take a variety of forms and can include, for example, operation in which, upon reception of wireless signals, the internal components detect communication signals and the transceiver 502 demodulates the communication signals to recover incoming information, such as voice and/or data, transmitted by the wireless signals. After receiving the incoming information from the transceivers 502, the processor 504 formats the incoming information for the one or more output components 508. Likewise, for transmission of wireless signals, the processor 504 formats outgoing information, which may or may not be activated by the input components 510, and conveys the outgoing information to one or more of the wireless transceivers 502 for modulation as communication signals. The wireless transceivers 502 convey the modulated signals to a remote device, such as a cell tower or an access point (not shown).

On a side note, although all of the electronic devices 410-414 can include wireless transceivers 502, it should also be understood that the electronic devices, especially the desktop computer 412 and the laptop computer 414, can include non-wireless transceivers that utilize other known communication technologies, such as wired communication technologies including wire-based modems for cable networks and telephonic networks (including dial-up and DSL modems).

The output components 508 can include a variety of visual, audio, and/or mechanical outputs. For example, the output components 508 can include one or more visual output components 516 such as the display screen 406. One or more audio output components 518 can include a speaker, alarm, and/or buzzer, and one or more mechanical output components 520 can include a vibrating mechanism for example. Similarly, the input components 510 can include one or more visual input components 522 such as an optical sensor of a camera, one or more audio input components 524 such as a microphone, and one or more mechanical input components 526 such as a touch-detecting surface, keyboard, keypad, mouse, and joystick. Actions that can actuate one or more input components 510 can include for example, powering on, opening, unlocking, moving, and/or operating the electronic devices 410-414.

The sensors 528 can include both proximity sensors 529 and other sensors 531, such as an accelerometer, a gyroscope, or any other sensor that can provide pertinent information, such as to identify a current location or orientation of the electronic devices 410-414.

As understood by those in the art, the processor 504 executes computer program code to implement the methods described herein. Embodiments include computer program code containing instructions embodied in tangible media, such as floppy diskettes, CD-ROMs, hard drives, solid-state drives or any other computer-readable storage medium, wherein, when the computer program code is loaded into and executed by the processor 504, the processor becomes an apparatus for practicing the methods described herein. Further, embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by an electronic device, such as the electronic devices 410-414, the electronic device becomes an apparatus for practicing the methods described herein. When implemented on a general-purpose microprocessor, the computer program code segments configure the microprocessor to create specific logic circuits.

Figure 6:
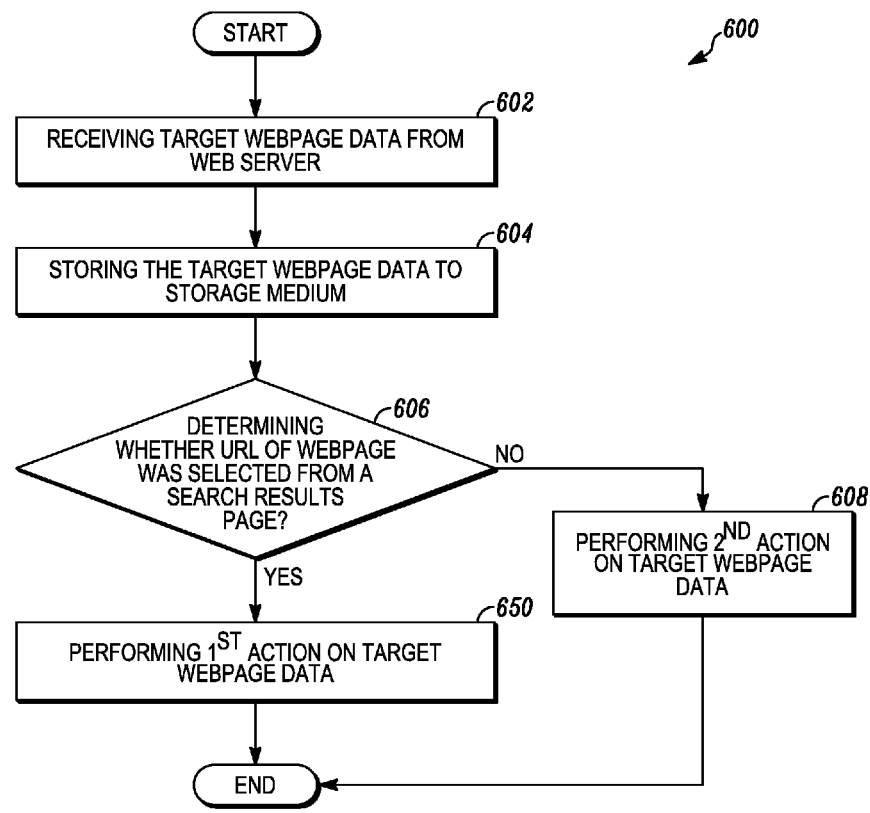
FIGS. 6-15 illustrate example methods performed by any one or more of the electronic devices of FIG. 4.

Turning attention now to the methods, FIG. 6 shows a flow chart representing a method 600 that any one (or more) of the electronic devices 410-414 of FIG. 4 can perform, such as at a time when a display screen of one of the electronic devices displays a web browser. The method 600 begins at a step 602, wherein one of the electronic devices receives target webpage data (e.g., data for a target webpage 200 shown in FIG. 2) from a web server, such as a web server host on the server computer 402, and then at a step 604 the electronic device (the one of the devices 410-414) stores the target webpage data from the web server on a processor readable storage medium, such as the memory 506 of the electronic device. A first URL, e.g., a URL 452 of the target webpage 450, identifies the target webpage.

Next at step 606, the processor 504 of the electronic device determines whether the first URL was selected from a search results page generated from a search engine executing a search string. As shown, if the first URL was selected from a search results page, the processor 504 performs a particular action on the target webpage data (e.g., a step 650); otherwise, the processor 504 performs an other action on the target webpage data (e.g., a step 608).

The determining of whether the first URL was selected from a search results page can include storing a second URL (that the processor 504 can obtain from a browser history or cache) to the processor readable storage medium, where the second URL identifies a webpage rendered immediately prior to the receiving of the target webpage data, and then determining whether the second URL includes a character string that resembles search string parameters. For example, when using a Google search engine web page (www.google.com) to search the Internet for the text string "Motorola Mobility", the URL of the search results page is: http://www.google.com/#hl=en&sugexp=kjrmc&cp=10&gs_id=s&xhr=t&q=motorola+mobility&pf=p&sclient=psy-ab&site=&source=hp&pbx=1&oq=motorola+m&aq=0&aqi=g4&aql=f&gs_sm=&gs_upl=&bav=on.2,or.r_gc.r_pw.,cf.osb&fp=de781d7dea595e90&biw=1043&bih=759. Similarly, when using a Bing search engine web page (www.bing.com) to search the Internet for the text string "Motorola Mobility", the URL of the search results page is: http://www.bing.com/search?q=motorola+mobility&qs=n&sk=&sc=8-17&form=QBLH. By analyzing a URL in the browser history, the processor 504 can determine the search terms (e.g., motorola+mobility) and that an Internet search engine was used (e.g., Google or Bing). If a user selects a hypertext link from the search results page, then the search term string can be used to improve the readability of the target webpage.

Alternatively, in some embodiments, the determining of whether the first URL was selected from a search results page can include storing a value to the processor readable storage medium, where the value represents a category of a webpage rendered immediately prior to the receiving of the target webpage data; and then determining whether the value represents a search results category. In either case, the processor 504 performs the determining of whether the first URL was selected from a search results page.

With respect to the search engine, a web server hosted by one or more of the server computers 402 or 404, any of the electronic devices 410-414 of FIG. 4, and/or the like, can host the search engine. In such embodiments, the search results page can be a web page or the like, and the search string can include textual, audio, video, or graphical information.

With respect to the particular action of the step 650, this can encompass a variety of alternatives, including for example steps 751, 757, and 759 (751-759), 851, 852, 858, and 859 (851-859), and 951, 952, 956, 957, and 959 (951-959) of FIGS. 4, 5, and 6 respectively. Whereas, the action of the step 608 can include rendering the target webpage data without resizing it to readable proportions (e.g., as depicted by the screenshot of the webpage 200 in FIG. 2).

Figure 7:
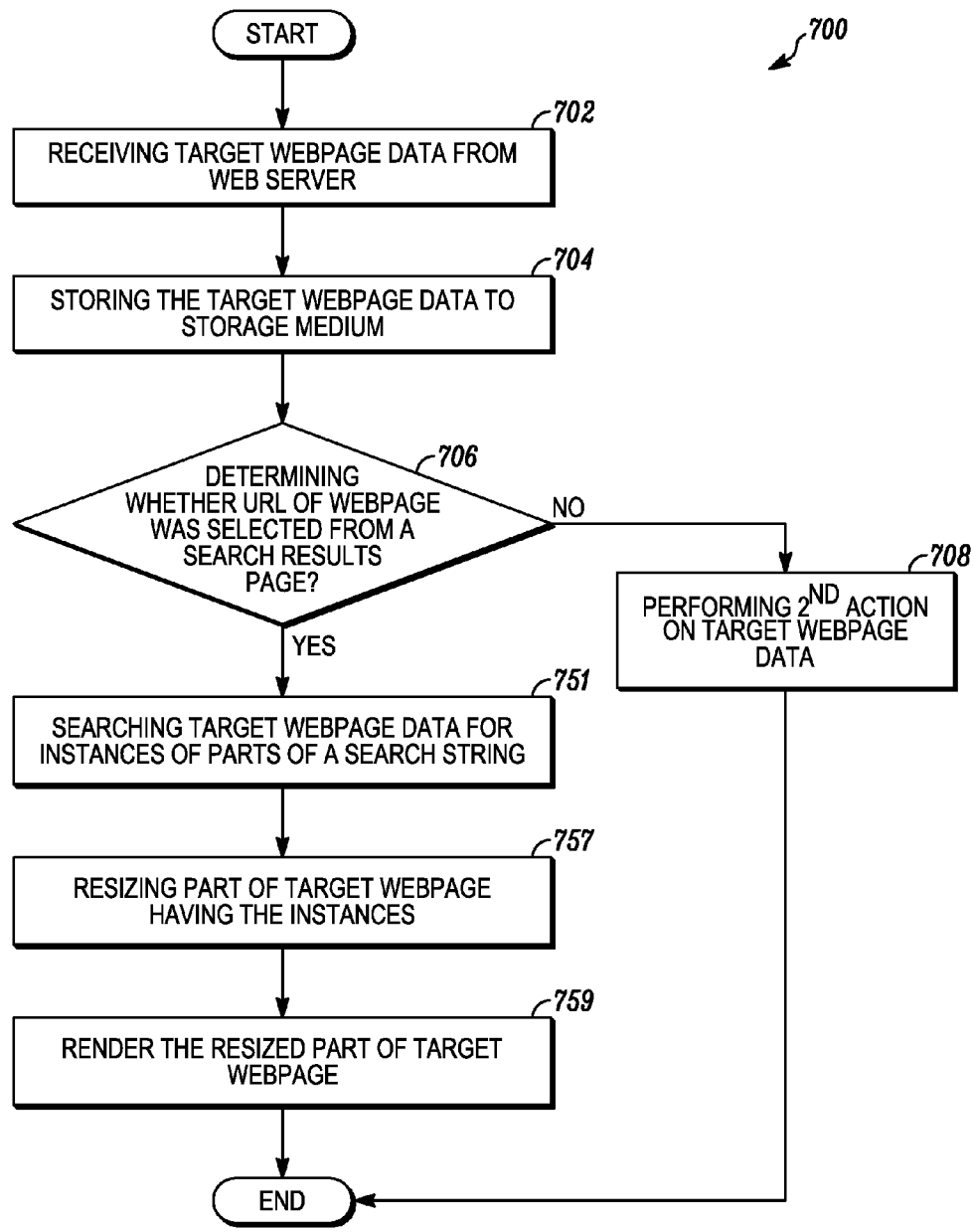

Referring to FIG. 7, steps 702, 704, 706, and 708 (702-708) from flowchart 700 are similar to steps 602, 604, 606, and 608 (602-608) shown in FIG. 6. FIG. 7 differs in that it depicts one of the alternatives of the particular action of the step 650 of FIG. 6. The alternative begins at a step 751 with the processor 504 performing searching of the target webpage data for one or more instances of one or more parts of a search string. Note that the search string may be directly determined from the preceding URL, when the preceding URL is a search results webpage. Next, at a step 752, the processor 504 performs resizing of one or more parts of the target webpage having the one or more instances of the one or more parts of the search string. At a step 759, the processor 504 instructs rendering of the resized parts of the target webpage on a display. Others parts of the webpage (possibly not-resized) many also be rendered.

Figure 8:
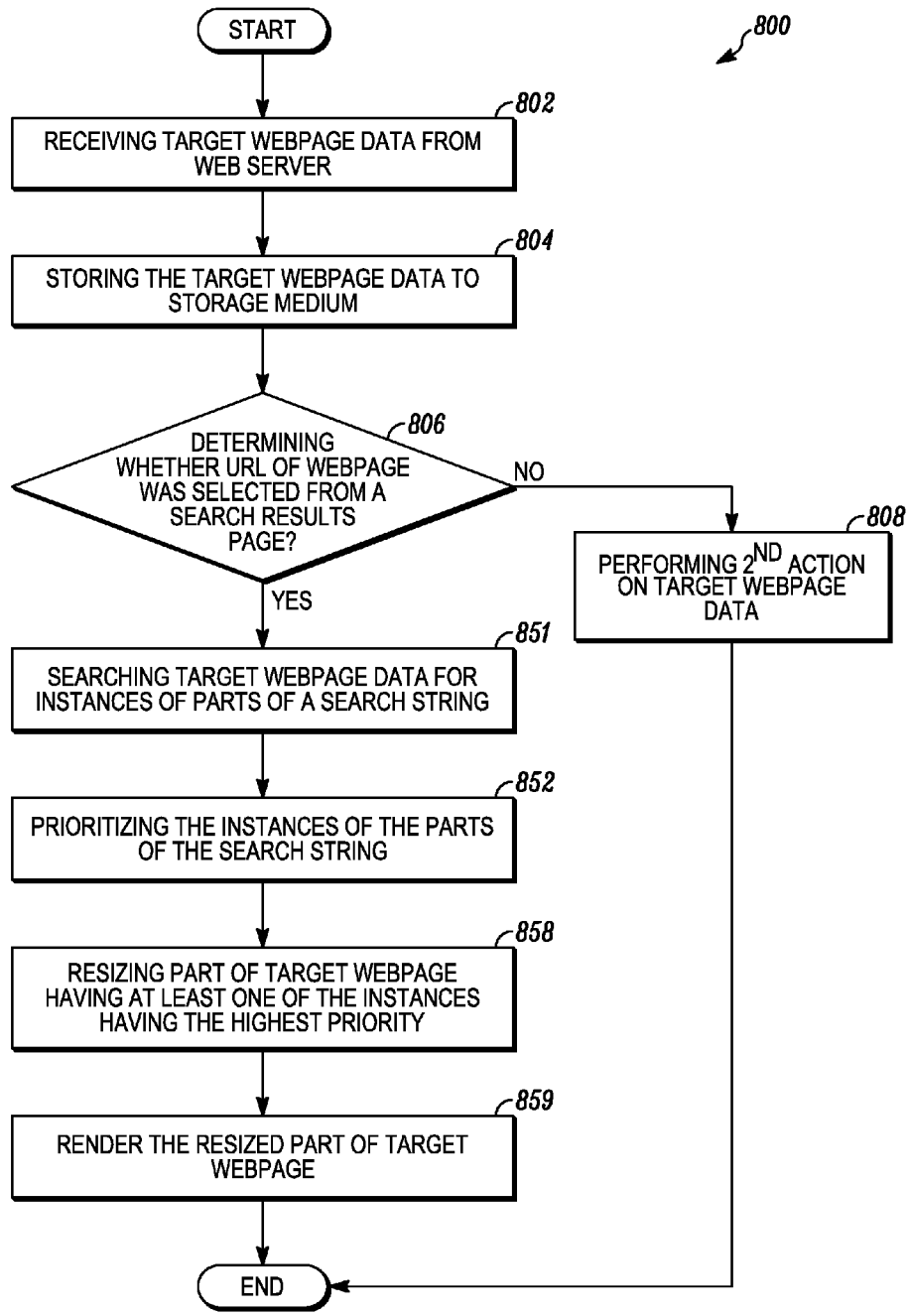

Referring now to FIG. 8, steps 802, 804, 806, and 808 (802-808) from flowchart 800 are also similar to steps 602-608 shown in FIG. 6. In addition, a step 851 is similar to the step 751 shown in FIG. 7. FIG. 8 differs from FIG. 7 in that it depicts a different step occurring subsequent to the step 751/851. As shown, in the embodiment of FIG. 8, the step 851 is followed by a step 852 in which the processor 504 prioritizes of the instances found during the searching of the target webpage data as per the step 851, where each of the one or more instances has (or is ascribed) a priority value. Details regarding prioritizing instances of the parts of the search string will be described later with references to FIG. 15. Next, at a step 858, the processor 504 resizes one or more parts of the target webpage having the one or more instances with the highest priority. At step 859, the processor instructs rendering of the resized parts of the target webpage on a display. Others parts of the webpage (possibly not-resized) many also be rendered.

Figure 9:
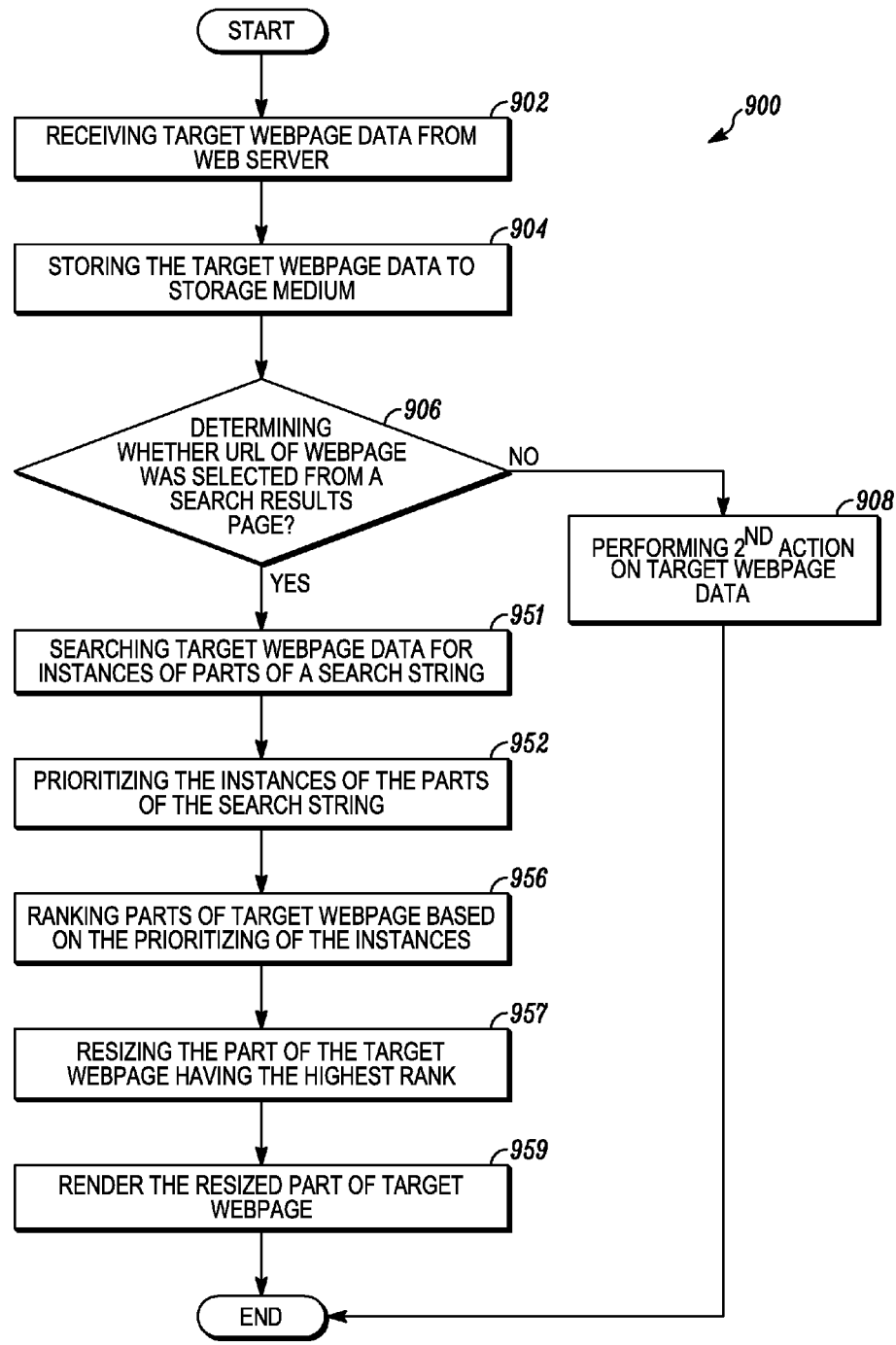

Referring to FIG. 9, steps 902, 904, 906, and 908 (902-908) of flowchart 900 are also similar to steps 602-608 shown in FIG. 6. In addition, steps 951 and 952 are similar to the steps 851 and 852 shown in FIG. 8. FIG. 9 differs from FIG. 8 in that it depicts different steps occurring subsequent to the step 852/952. As shown, after the step 952, the process advances to a step 956 at which the processor 504 ranks parts of the target webpage data based on the priorities ascribed to the one or more instances per the step 952. In performing the step 956, each of the parts of the target webpage is given a rank, and one of the parts has a highest rank with other parts having different ranks in descending value. Next, at a step 957, the processor 504 performs resizing of the one of the parts of the target webpage having the highest rank. At step 959, the processor instructs rendering of the resized parts of the target webpage on a display. Others parts of the webpage (possibly not-resized) many also be rendered.

Figure 10:
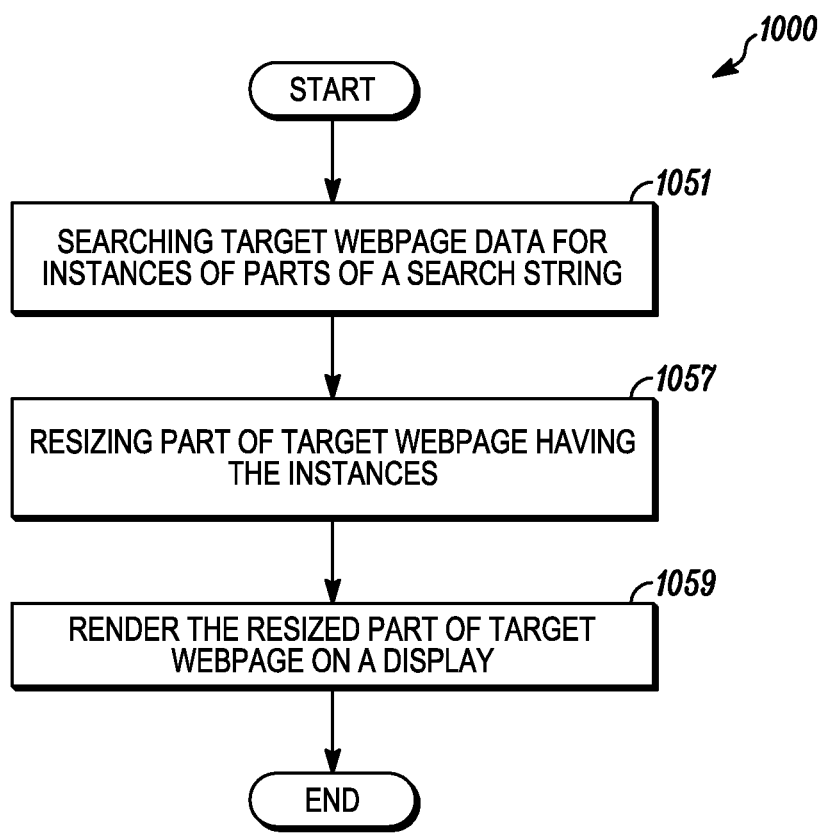
Figure 11:
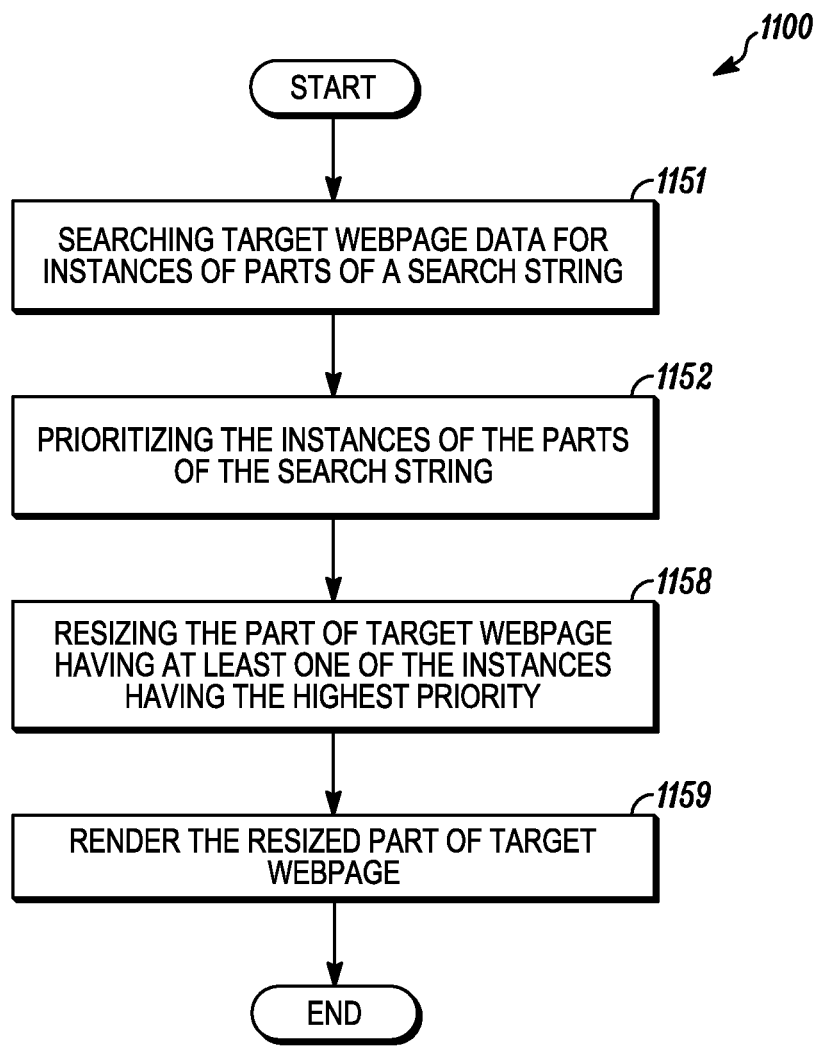
Figure 12:
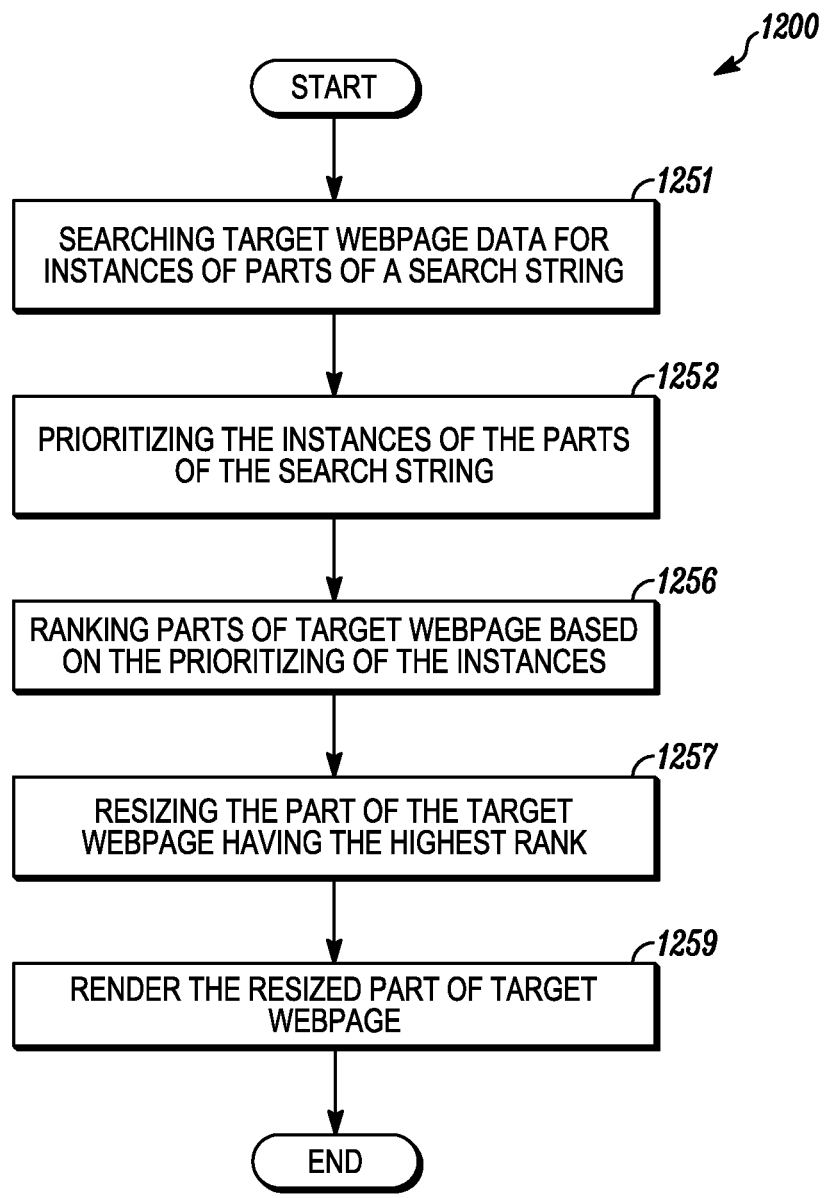

As previously mentioned, FIGS. 7-9 depict flowcharts 700, 800, and 900, which all include the determining of whether the URL of the target webpage was selected from a search results page at steps 706, 806, and 906, respectively. However, searching of the target webpage data for one or more instances of one or more parts of a search string and then resizing of a part of the target webpage having the one or more instances can occur without such a determination. For example, FIGS. 10-12 depict steps similar to the steps of FIGS. 7-9 illustrating three possible alternatives of the particular action of the step 650. Particularly, steps 1051-1059, 1151-1158, and 1251-1259 are similar to the steps 751-759, 851-859, and 951-959, respectively, except the steps 1051-1059, 1151-1159, and 1251-1259 do not require steps 602-608 (or steps similar to steps 602-608) to precede them.

Figure 13:
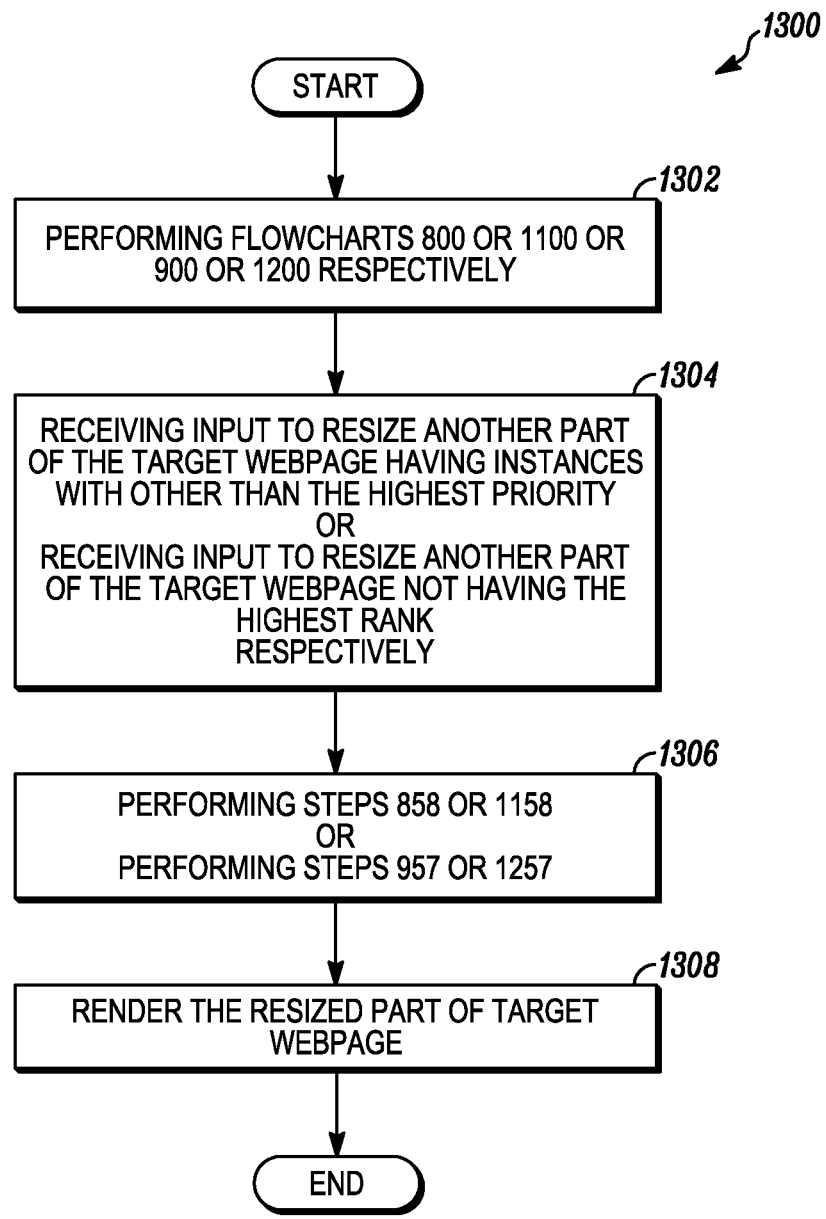

Referring to FIG. 13, depicted is a flowchart 1300, which for example, can follow any of the flowcharts 800, 900, 1100, or 1200, or any other embodiment that includes prioritizing of the one or more instances of the one or more parts of a search string, or ranking 956, 1256, based on the prioritizing of the one or more instances, the parts of a target webpage data. As shown, the flowchart 1300 includes a step 1302 representative of performing any of the flowcharts 800, 900, 1100, or 1200, then, at a step 1304, for example (where the flowcharts 800 or 1100 were performed), the one or more input components 510 facilitate receiving of input to resize an other part of the target webpage data having one or more instances having a priority other than the highest priority (such as the next highest priority), and then the processor 504 performs resizing of the other part of the target webpage. For example, a user can press or select a key or virtual button (e.g., tab key or virtual "next" key, respectively), which refocuses the browser (or moves the cursor of the browser) to another instance (e.g. the next instance) of the search string, which may be the next lower priority instance or the next higher priority instance (e.g., as a result of the user pressing shift and tab keys simultaneously or a virtual "previous" key).

Alternatively, where the flowcharts 900 or 1200 were implemented, at the step 1304, the one or more input components 510 facilitate receiving of input to resize another part of the target webpage not having the highest rank, and then the processor 504 performs resizing of the other part of the target webpage. With respect to the step 1304, in some embodiments, the electronic device can receive input from the user to jump to the next instance of the one or more parts of the search string and/or to the previous instance of the one or more parts of the search string; and in some other embodiments, the device can receive input to jump to the next highest ranked part of the webpage and/or the previous ranked part of the webpage. At a step 1306, the flowchart 1300 represents steps equivalent to the steps 858 or 1158 or the steps 957 or 1257, except resizing occurs at portions of the webpage that do not have instances with the highest priority or resizing occurs at parts of the webpage that does not have the highest rank, respectively. And at step 1308, the process instructs rendering of the resized part of the target webpage.

With respect to the resizing of the one or more parts of the target webpage, such resizing can occur by rewrapping the one or more parts of the target webpage and/or by storing a content resizing coefficient to the processor readable storage medium where the resizing of the one or more parts of the target webpage is derived from the content resizing coefficient. The content resizing coefficient can be based on user settings of the browser application rendering the target webpage (e.g., Internet Explorer→View→Text Size=Largest-Larger-Medium-Smaller-Smallest OR Android Browser→Settings→Text Size=Tiny-Small-Normal-Large-Huge, etc.). Further, the resizing coefficient for a mobile phone or a tablet will be different, and the resizing coefficient for software that assists the visually impaired will have a different resizing coefficient as well.

Figure 14:
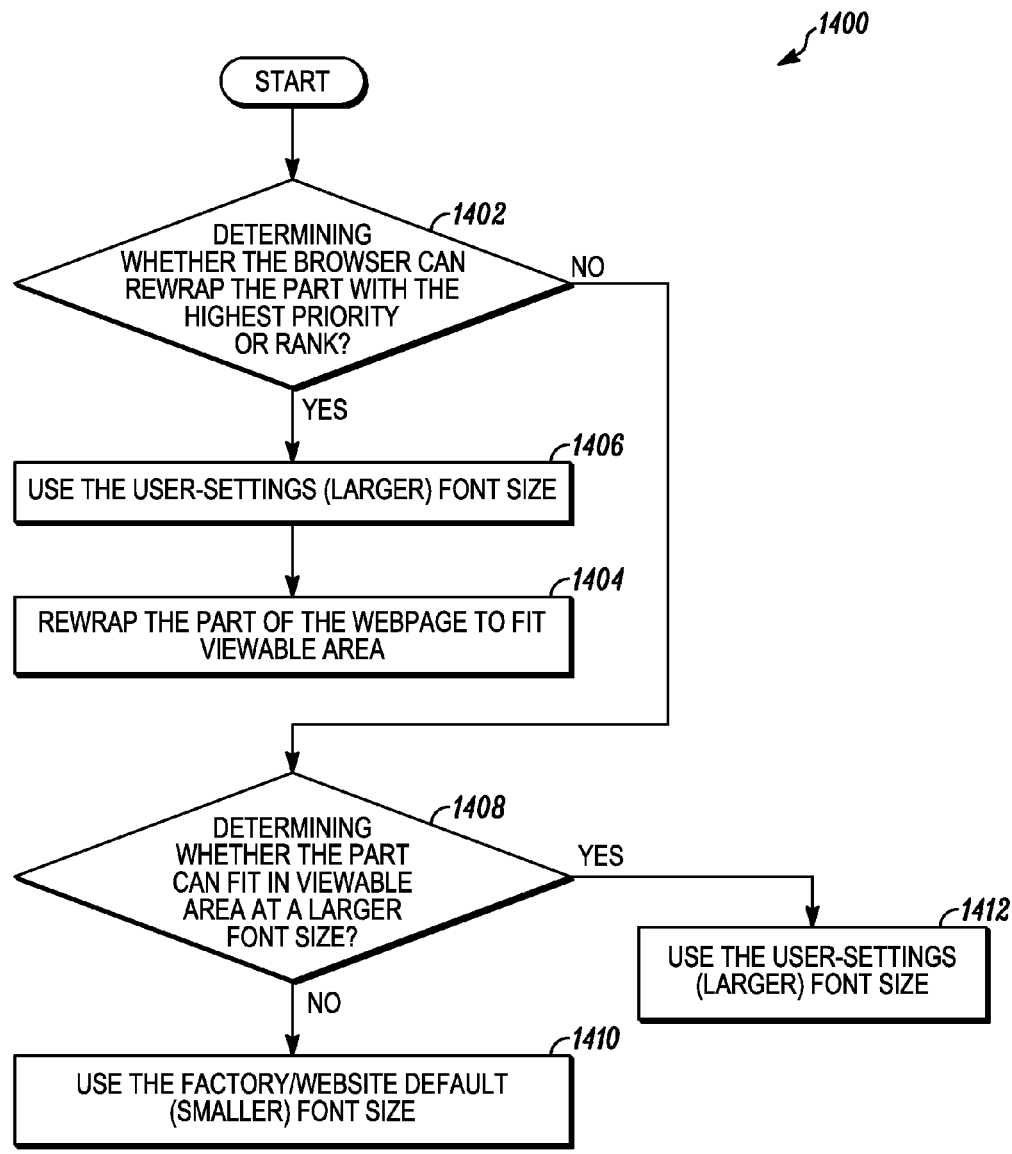

With respect to FIG. 14, in some embodiments, the processor 504 performs resizing through a sub-routine 1400 (which can be a sub-routine of the steps 752, 858, 957, 1057, 1158, 1257 of FIGS. 7-12, respectively) that includes the following steps. The sub-routine 1400 begins by determining whether the web browser can rewrap the part of the target webpage with the highest priority instances of the search string or the highest priority rank at a step 1402, and if it can, then it rewraps the part of the webpage to fit the viewable area of a graphical user interface (GUI) component (displayed for example by a display of any one of the electronic devices 410-414) displaying the webpage 1404 and it resizes the font to a comfortable reading size (which can be based on user settings of the browser application rendering the target webpage) 1406. If the browser cannot rewrap the part of the webpage, then the sub-routine determines whether the part can fit in the viewable area of the GUI component at a larger font size 1408, and if it can, it resizes the font to the larger font size (which can be based on user settings of the browser application rendering the target webpage) 1412; otherwise, it resizes the font to a smaller (or default) font size (which can also be based on user settings of the browser application rendering the target webpage) 1410.

Such techniques for the resizing of the one or more parts of the target webpage facilitate focusing in on content of interest that a user has specified in the search string that was executed by the previously mentioned search engine that generated the search results page.

Figure 15:
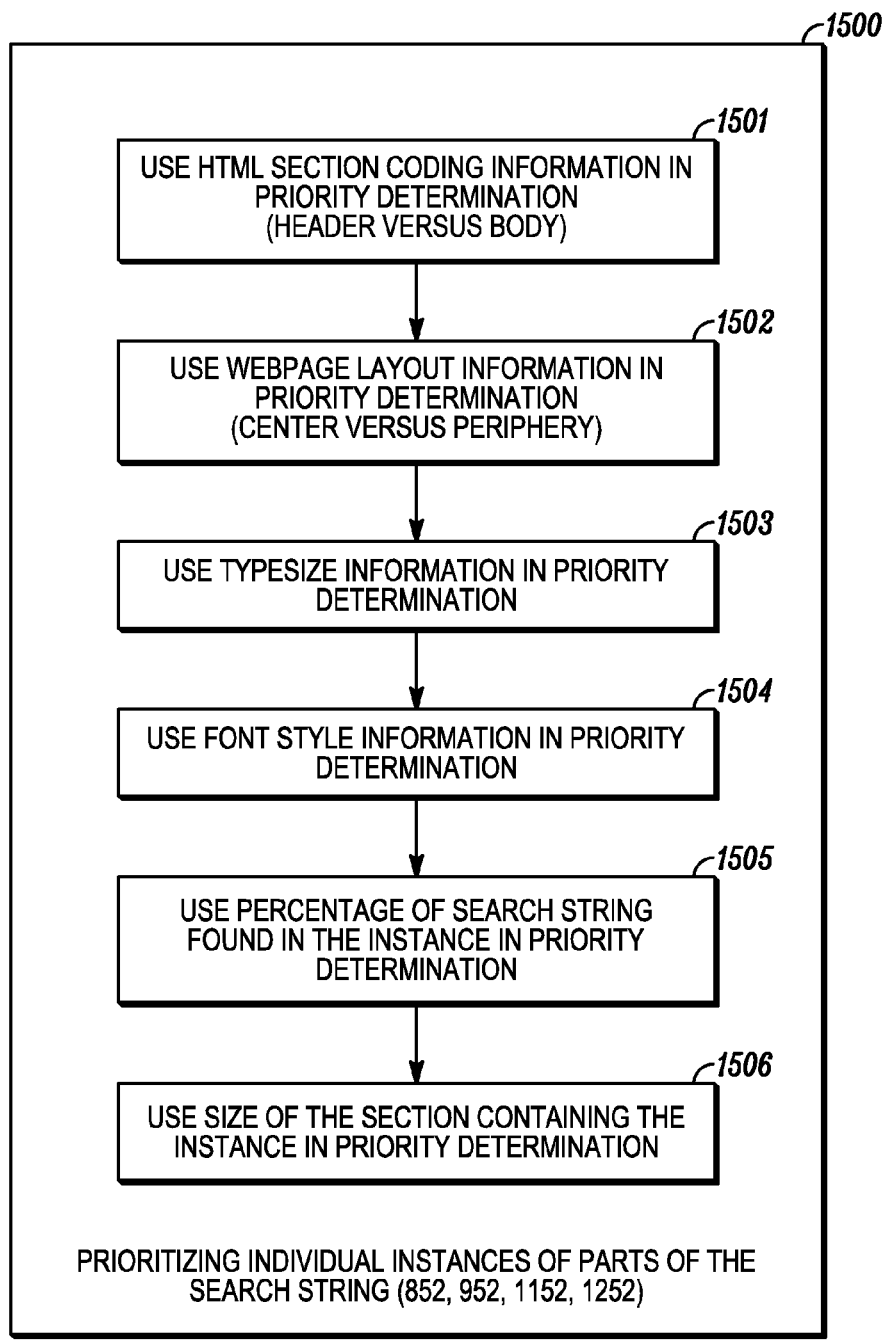

With respect to the prioritizing of the one or more instances of the one or more parts of the search string, there are a number of factors in determining the priority of an instance as illustrated by sub-routine 1500 of FIG. 15, which could be a sub-routine of the steps 852, 952, 1152, and 1252 of FIGS. 8, 9, 11, and 12, respectively. For example, the location of the instance can influence its priority, such as whether the instance is in a section heading or the body of a section 1501 (e.g., which can be determined by examining the HTML coding of the target webpage data), and/or whether the instance is near the center of the webpage or on the periphery 1502. Additionally, the formatting of the instance can influence its priority, such as the font size 1503, font style (e.g., italics, bold 1504, underline, and all caps), and font type (e.g., Times New Roman, Arial, etc. . . . ). Furthermore, the percentage of the search string the instance contains 1505 can influence its priority. For example, in some embodiments, an instance that contains the entire search string is going to have a greater priority than an instance that only contains one word of the search string.

In some embodiments, the amount of the search string found in an instance 1505 is the most important factor governing priority. In some other embodiments, the most important factor is the location of the instance and/or the formatting of the instance. Additionally, in one embodiment, the primary factor is whether the instance is in a section heading 1501, then whether its font is bold 1504, then whether it is near the center of the webpage or its periphery 1502, then whether its section is larger than other sections 1506, and then finally the percentage of the search string in the instance 1505. In an other embodiment, the primary factor is whether the instance is near the center of the webpage or its periphery 1502, then the percentage of the search string in the instance 1505, then whether its section is larger than other sections 1506, then whether it is in a section heading 1501, and then finally whether its font is bold 1504.

With respect to the benefits of the methods disclosed herein, in general, each of these methods facilitates navigation of content searchable on the Internet. Particularly these methods facilitate focusing in on desired content of a webpage, where in focusing in on such content may be difficult due to size of a respective display screen, complexity of webpage navigation inputs such as common navigational gestures of touch screens, and/or impairments of a user such as visual or mechanical impairments.

Finally, it is specifically intended that the present invention not be limited to the embodiments and illustrations contained herein, but include modified forms of those embodiments, including portions of the embodiments and combinations of elements of different embodiments as come within the scope of the following claims. For example, although the steps of the flowcharts 600, 700, 800, 900, 1000, 1100, 1200, 1300, 1400, and 1500 imply an order, the steps can be rearranged logically in at least some embodiments (e.g., the step 606 can occur prior to the steps 602 and 604).

We claim:

1. A method performed by a processor of an electronic device, comprising:
   receiving target webpage data representative of a target webpage from a web server and storing the target webpage data to a processor readable storage medium of the electronic device, wherein the target webpage data is identified by a first uniform resource locator (URL); and
   determining whether the first URL was selected from a search results page generated from a search engine executing a search string, the determining including:
   retrieving, from the processor readable storage medium, a second URL that identifies a webpage rendered immediately prior to the receiving the target webpage data; and
   determining whether the second URL includes a character string that resembles search string parameters including at least a portion of the search string;
   responsive to determining that the first URL was selected from the search results page, performing a first action on the target webpage data that comprises:
   searching the target webpage data for one or more instances of at least one part of the search string;
   prioritizing the one or more instances, wherein each of the one or more instances has a priority value that is based, at least in part, on one or more factors selected from a list comprising location of an instance, formatting of an instance, and percentage of the string composing an instance;
   ranking, based on the prioritizing of the one or more instances, parts of the target webpage data, wherein each of the parts has a rank, and wherein one of the parts has a highest rank; and
   responsive to determining that a first part of the target webpage associated with a part of the target webpage data having an instance that has the highest rank can be rewrapped, rewrapping at least a portion of the first part of the target webpage; and
   responsive to determining that the first part of the target webpage associated with a part of the target webpage data having the instance that has the highest rank cannot be rewrapped, resizing at least a portion of the first part of the target webpage according to a resizing coefficient; and
   responsive to receiving, at the processor, an indication of user input, resizing a second part of the target webpage having an instance that has a rank that is lower than the highest rank.

2. The method of claim 1, wherein the determining whether the first URL was selected from the search results page includes:
   retrieving a value from the processor readable storage medium, wherein the value represents a category of a webpage rendered immediately prior to the receiving of the target webpage data; and
   determining whether the value represents a search results category.

3. The method of claim 1, wherein the search string includes textual, audio, video, or graphical information.

4. A method performed by a processor of an electronic device, comprising:
   receiving target webpage data representative of a target webpage from a web server and storing the target webpage data to a processor readable storage medium of the electronic device, wherein the target webpage data is identified by a first uniform resource locator (URL); and determining whether the first URL was selected from a search results page generated from a search engine executing a search string, the determining including:

retrieving a value from the processor readable storage medium, wherein the value represents a category of a webpage rendered immediately prior to the receiving the target webpage data; and determining whether the value represents a search results category;

responsive to determining that the first URL was selected from the search results page, performing a first action on the target webpage data that comprises:

searching target webpage data, stored on the processor readable storage medium of the electronic device, for one or more instances of at least one part of a search string;

prioritizing, based on the searching, the one or more instances, wherein each of the one or more instances has a priority value, and wherein at least one of the one or more instances has a highest priority value, wherein the priority value is based, at least in part, on one or more factors selected from a list comprising location of an instance, formatting of an instance, and percentage of the string composing an instance;

ranking, based on the prioritizing of the one or more instances, parts of the target webpage data, wherein each of the parts has a rank, and wherein one of the parts has a highest rank;

responsive to determining that a first part of the target webpage associated with a part of the target webpage data having the highest rank can be rewrapped, rewrapping at least one part of the first part of the target webpage;

responsive to determining that the first part of the target webpage associated with the part of the target webpage data having the highest rank cannot be rewrapped, resizing the at least one part of the first part of the target webpage according to a resizing coefficient; and responsive to receiving, at the processor, an indication of user input, resizing a second part of the target webpage associated with a part of the target webpage data having a rank that is lower than the highest rank.

5. The method of claim 4, further comprising:
reading a content resizing coefficient from the processor readable storage medium, wherein resizing the second part of the target webpage associated with a part of the target webpage data uses the content resizing coefficient.

6. The method of claim 4, wherein the search string includes textual, audio, video, or graphical information.

7. The method of claim 4, further comprising:
responsive to determining that the first URL was not selected from the search results page, performing a second action on the target webpage data that does not include searching the target webpage data.

8. The method of claim 4, wherein the highest priority value is given to the at least one of the one or more instances comprising a greatest amount of the search string relative to other instances.

9. A method performed by a processor of an electronic device, comprising:

receiving target webpage data representative of a target webpage from a web server and storing the target webpage data to a processor readable storage medium of the electronic device, wherein the target webpage data is identified by a first uniform resource locator (URL); and determining whether the first URL was selected from a search results page generated from a search engine executing a search string, the determining including:

retrieving, from the processor readable storage medium, a second URL that identifies a webpage rendered immediately prior to the receiving the target webpage data; and determining whether the second URL includes a character string that resembles search string parameters including at least a portion of the search string;

responsive to determining that the first URL was selected from the search results page, performing a first action on the target webpage data that comprises:

searching the target webpage data for one or more instances of at least one part of the search string;

prioritizing, based on the searching, the one or more instances, wherein each of the one or more instances has a priority value, and wherein at least one of the one or more instances has a highest priority value, wherein the priority value is based, at least in part, on one or more factors selected from a list comprising location of an instance, formatting of an instance, and percentage of the search string composing an instance;

ranking, based on the prioritizing of the one or more instances, parts of the target webpage data, wherein each of the parts has a rank, and wherein one of the parts has a highest rank;

responsive to determining that a first part of the target webpage associated with a part of the target webpage data having the highest rank can be rewrapped, rewrapping at least one part of the first part of the target webpage; and responsive to determining that the first part of the target webpage associated with a part of the target webpage data having the highest rank cannot be rewrapped, resizing the at least one part of the first part of the target webpage according to a resizing coefficient.

* * * * *